Figure 1:
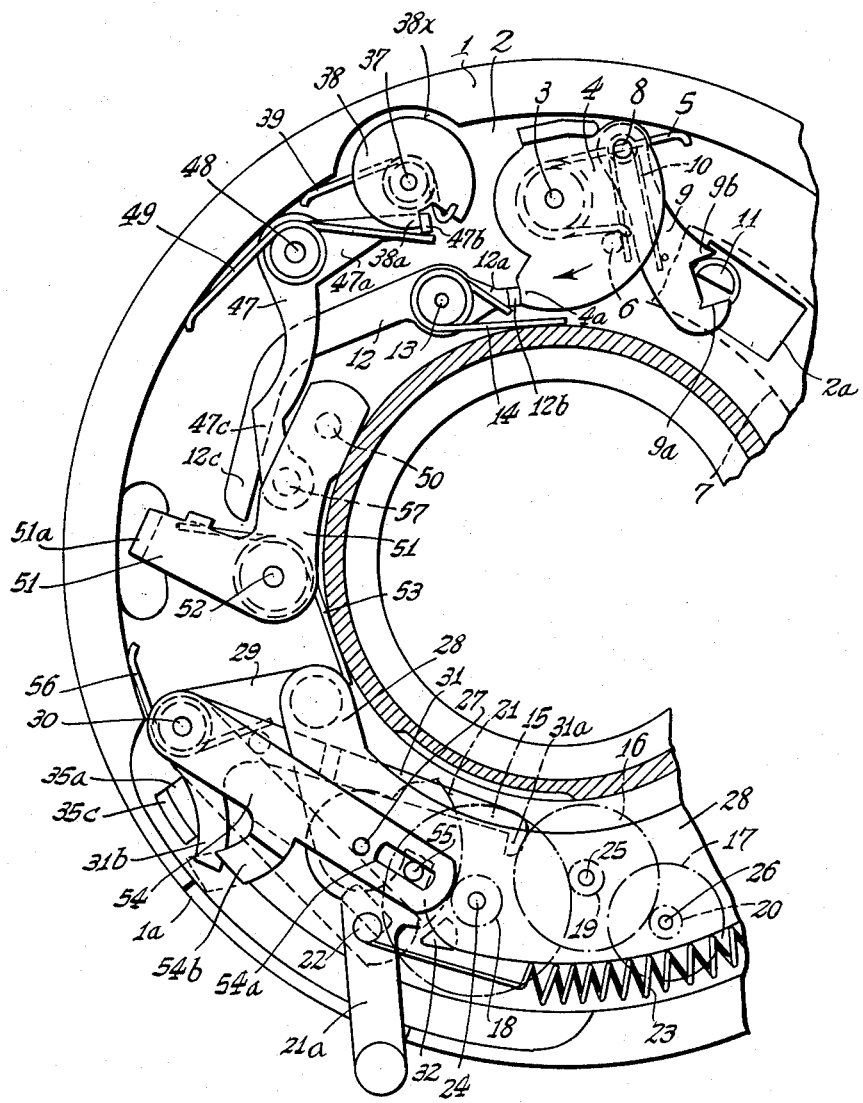

Jan. 14, 1964  E. WELLER  3,117,505
PHOTOGRAPHIC CAMERA HAVING AUTOMATIC EXPOSURE SETTING MEANS
Filed Jan. 24, 1961  3 Sheets-Sheet 1

INVENTOR.
Erwin Weller
BY
March and Curtiss
ATTORNEYS

Jan. 14, 1964  E. WELLER  3,117,505
PHOTOGRAPHIC CAMERA HAVING AUTOMATIC EXPOSURE SETTING MEANS
Filed Jan. 24, 1961  3 Sheets-Sheet 2

INVENTOR.
Erwin Weller
BY
March and Curtiss
ATTORNEYS

Jan. 14, 1964     E. WELLER     3,117,505
PHOTOGRAPHIC CAMERA HAVING AUTOMATIC EXPOSURE SETTING MEANS
Filed Jan. 24, 1961     3 Sheets-Sheet 3

INVENTOR.
*Erwin Weller*
BY
*March and Curtiss*
ATTORNEYS

United States Patent Office 3,117,505
Patented Jan. 14, 1964

3,117,505
PHOTOGRAPHIC CAMERA HAVING AUTOMATIC
EXPOSURE SETTING MEANS
Erwin Weller, Calmbach (Enz), Germany, assignor to Alfred Gauthier, G.m.b.H., Calmbach (Enz), Germany, a corporation of Germany
Filed Jan. 24, 1961, Ser. No. 84,601
Claims priority, application Germany Jan. 29, 1960
1 Claim. (Cl. 95—53.3)

This invention relates to photographic cameras of the type which have automatic exposure setting devices.

Cameras of this kind, constructed in various ways, are already well known. They have the important advantage that it is possible to obtain an exposure setting of maximum accuracy, taking into account prevailing light conditions, as well as to effect such setting with maximum speed and simplicity.

An object of the present invention is to provide a novel and improved camera of the above-mentioned type having automatic exposure setting means, which retains to the greatest possible extent the known simplicity, economy and flexibility as well as the functional dependability while at the same time incorporating a delayed action device by which the advantages of the latter may also be realized, without detriment.

This problem is accomplished, in accordance with the invention, by the provision of a novel control member and powered driving device therefor, the said member being associated with an exposure setting member of the camera which latter is influenced by the light intensity measuring device, and being so arranged that it is retained in a cocked position by a locking device which is releasable in response to actuation of the camera or shutter release member. The said control member when reaching the end of its running down movement sets free the powered drive mechanism for the camera shutter. In conjunction with this organization there is provided a selectively connectable delayed action device having both cocked and run-down or inoperative states or conditions, together with a second locking device which is operative for the cocked state of the delayed action device and which halts the control member after its release and after a small initial movement through part of its path of travel. This initial movement of the control member is utilized to release the delayed action device from the cocked state. The camera setting member also experiences an initial movement concurrently with the initial movement of the control member. Then at a later time the second locking device is rendered inoperative, this being effected in response to complete running down of the delayed action device, thereby to release the control member for completion of movement of the latter, during which the setting member is freed for adjusting movement as determined by the light intensity measuring device.

A camera as thus provided in accordance with the invention has the advantage that, where photographs are to be taken either with or without the delayed action device, the effecting of the automatic exposure occurs only immediately prior to the release of the camera shutter. This has the beneficial result that the setting is always effected by adjustment of the exposure setting member in response to those light conditions which prevail immediately prior to the release of the camera shutter. Especially, it is to be noted that full allowance is thus made for any changes in the lighting which may possibly occur during the time that the delayed action device is running down. This mode of operation is obtained in a camera constructed in accordance with the invention, in a surprisingly simple manner by the use of a single locking member which becomes operative upon the delayed action device being placed in the cocked state. In so becoming operative the single locking member halts the released control member, which effects restraint on the exposure setting member, after such control member has had an initial movement through a small portion of its total path of travel. The said locking member is, in turn, released by the delayed action device when this latter reaches the end of its running down movement, thereby to release the control member for completion of the said path of travel, during which the automatic adjustment of the setting member is accomplished. The device provided by the invention requires relatively few parts or components and is simple in its construction, enabling a compact arrangement to be had which results in an appreciable saving of space. In addition, it has the advantage that its construction requires no changes or re-design of the camera release member or the delayed action device, so that it is possible to employ the invention for numerous applications covering a wide range.

The accompanying drawings illustrate two embodiments of the invention, comprising photographic intralens shutter structures. FIG. 1 is a fragmentary vertical sectional view, looking to the front, of a photographic intra-lens shutter, the cover plate being not shown so as to reveal the interior components. Arranged in the shutter housing are releasable locking devices as provided by the invention, for retaining the shutter drive mechanism and the control member in their cocked positions. The control member is adapted to effect a restraint of the exposure setting member of the camera and is itself controlled by a delayed action device. In this figure the shutter and control member are in their cocked positions, and the delayed action device is in the uncocked or inoperative state.

Figure 2:
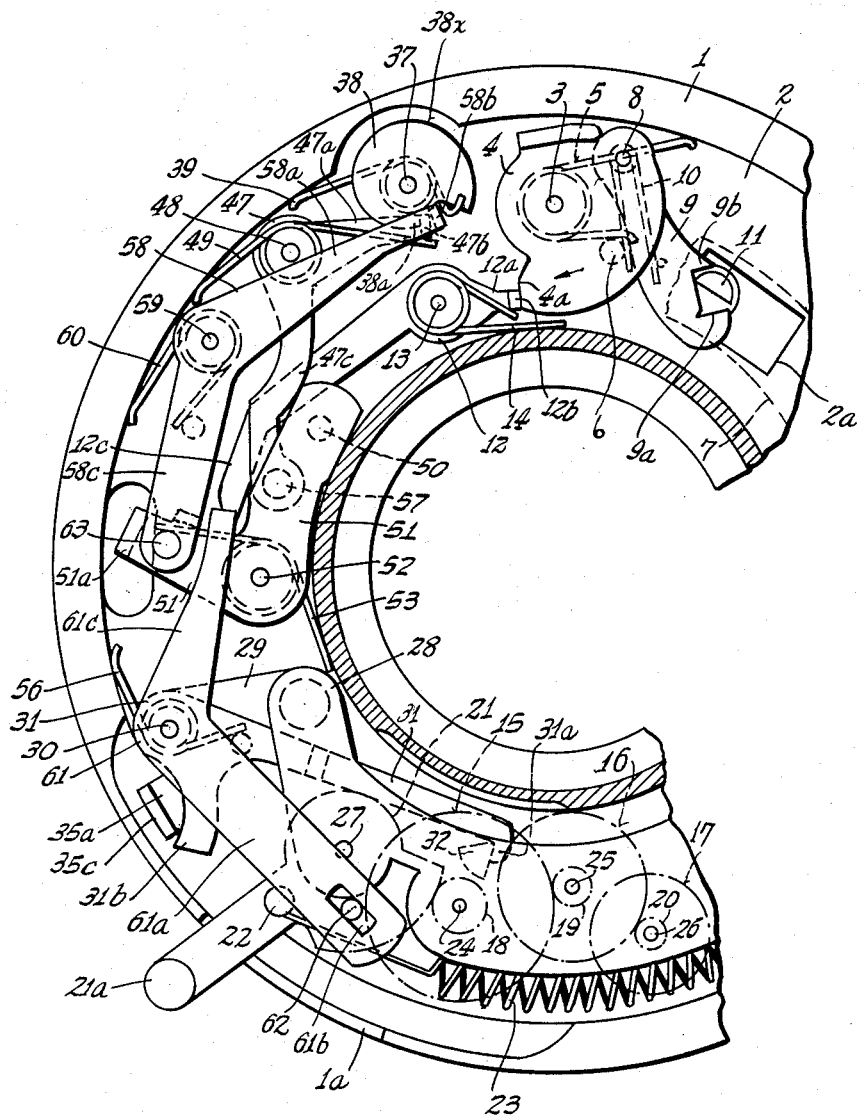

FIG. 2 is a view similar to that of FIG. 1 but showing another type of release device. In this figure the control member and also the shutter drive are in their cocked positions. Also, the delayed action device is shown in its cocked state, in readiness for operation.

Figure 3:
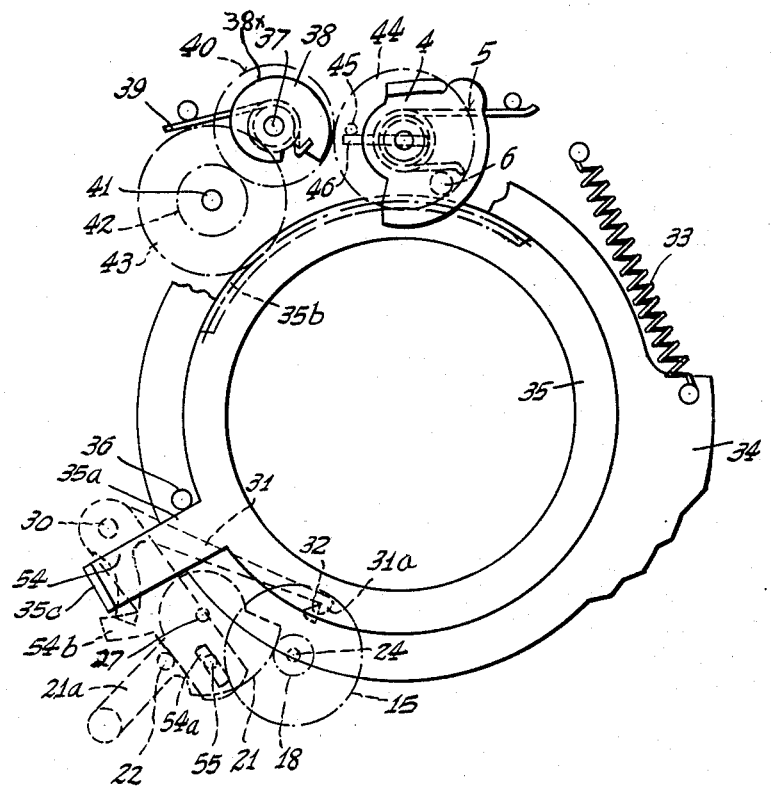

FIG. 3 is a diagrammatic showing, representing a front view of the exposure setting member and also of the control member associated with the same. This figure also shows the driving and locking devices which cooperate with the control member.

In connection with the above figures it is to be noted that one embodiment of the invention will be illustrated when FIGURES 1 and 3 are taken together, whereas the second embodiment of the invention will be illustrated when FIGURES 2 and 3 are taken together. Those components in FIGURE 2 which are identical in construction and function to corresponding components in FIGURE 1 have been given like characters, and such components of like character have a similar cooperable relationship with the structure of FIG. 3.

As seen in FIG. 1, the housing of the photographic intra-lens shutter structure is indicated by the numeral 1. The camera having such shutter structure is not shown in the drawing, for the sake of simplicity of illustration. Affixed in the shutter housing 1 in a well-known manner is a base plate 2, which serves to mount well-known members or portions of the shutter mechanism. More particularly, there is mounted on the shutter base plate 2 a cocking and driving disk 4 for the shutter, such disk being carried by a pivot pin 3 in the usual manner. The driving disk 4 has a driving spring 5 which engages the interior side wall of the shutter housing 1 and also engages a pin 6 affixed to the disk.

For the purpose of actuating a driving ring 7 for the shutter blades (which are not shown for the sake of clarity of illustration) there is provided a usual type of driving link 9 which is pivotally carried in a well-known manner on a pivot pin 8 affixed to the driving disk 4. The link 9 has a side notch in its free end, providing jaws 9a and

3

9b between which there is received a pin 11 of semi-circular cross section. The link 9 is biased in a counter-clockwise direction to maintain engagement between the pin 11 and the jaws 9a, 9b by a usual type of wire spring 10. The pin 11 is affixed to the shutter blade driving ring 7, and extends through a clearance slot 2a provided in the shutter base plate 2. During the running-down movement of the shutter driving disk 4, which occurs in a clockwise direction as indicated by the arrow in FIG. 1, the driving ring 7 executes a well-known reciprocating movement whereby the shutter blades are first opened and, after reaching an open position, are again closed.

An arresting or detent lever 12 serves to retain the driving disk 4 in the cocked position against the action of the driving spring 5, such lever being pivotally movable about an axis 13 affixed to the shutter base plate 2. One arm 12a of the lever 12 has a bent lug 12b arranged to engage a projection or shoulder 4a provided on the driving disk 4, whereas the other lever arm 12c cooperates, in a manner described below, with a releasable locking device. The lever 12 is biased in a counterclockwise direction by a wire spring 14.

Carried by the shutter base plate 2 is a well-known delayed action device. The said delayed action device as illustrated in FIGS. 1 and 2 comprises three gears 15, 16 and 17, together with three pinions 18, 19 and 20. A toothed segment 21 engages the pinion 18, such segment being normally powered or biased in a counterclockwise direction by a helical extension spring 23. The spring 23 at one end engages a pin 22 affixed to the segment 21, and the other end of the spring 23 is secured to the shutter base plate in any suitable manner. The delayed action members 15 through 21 are carried on axes 24, 25, 26 and 27 located between and bearing on two bearing plates 28 and 29. For the purpose of cocking the delayed action device against the action of the spring 23 the toothed segment 21 has a fingerpiece 21a, which passes through a clearance slot 1d provided for it in the side wall of the shutter housing 1. The retaining of the delayed action device in its cocked position as shown in FIG. 2 is effected by means of an arresting or detent lever 31 which is pivotally movable about an axis 30 carried by the lower bearing plate 29. The detent lever 31 has a projection 31a adapted to engage, when the delayed action device is cocked as seen in FIG. 2, a three-cornered pin 32 which is affixed to the gear 15.

Additionally, the shutter construction comprises an annular exposure setting member 34 which is biased in a counterclockwise direction by a driving spring 33 (FIG. 3). The exposure setting member may, for example, be an exposure time adjusting ring, or else a diaphragm adjusting ring, or else it may be an exposure-value setting member or ring. The setting ring 34 is automatically adjusted in response to indications or movement of a well-known light intensity measuring device which is not shown for reasons of clarity of illustration. The control or adjustment of the exposure time setting ring 34 may, for example, be effected by means of a mechanical stop which is adjustable by the light intensity measuring device and which senses, preferably by means of a pressure-relief arrangement, the position of a turnable coil of a galvanometer which is fed by current from a photoelectric cell. The mechanical stop is cooperable with a stepped cam (not shown) which is connected to the exposure setting ring 34. Such automatic setting mechanisms are well known and are shown for example, in German Patent 832,390 and in French Patent 1,138,-435. Also, an automatic setting device of the type outlined above is described and illustrated in the copending application of Karl F. Rentschler, Serial No. 56,058, filed September 14, 1960, and entitled Photographic Camera Having Automatic Exposure Setting Means, having common ownership with the present application.

In accordance with the present invention the automatic setting of the camera is effected only immediately prior to the release of the shutter, for exposures both with and without the use of the delayed action device. In accomplishing this there is provided a control member which is influenced by a powered driving device and which is correlated with the exposure setting ring 34, being retainable in a cocked position by means of a releasable locking device which latter is actuated in response to operation of the camera release member.

The said control member at the end of its running down movement, or an associated device, releases the driving disk 4 of the camera shutter. The arrangement is such that placing the delayed action device in its cocked state causes the locking device to become operative, such locking device halting the control member after release of the same and after said control member has had an initial movement through a small portion of its total path of travel. This initial movement of the control member now serves to release the delayed action device, and there is associated with such initial movement a preliminary concurrent movement of the exposure setting ring 34. The said locking device is, in turn, released in response to completion of the running down movement of the delayed action device, and thus it releases the control member whereby the latter is enabled to continue through the remainder of its path of travel.

The control member comprises, in the two illustrated embodiments of the invention, a ring 35 which is mounted to be concentric with the exposure setting ring 34 (see FIG. 3). The control ring 35 has an arm 35a in whose path of motion there is a pin 36 affixed to the exposure setting ring 34. Accordingly, the arm 35a and pin 36 comprise a transmission device which is so arranged that the setting ring 34, being biased in a counterclockwise direction, will be restrained against movement in this direction but will follow the control ring 35 when the latter is driven counterclockwise.

The driving device which is associated with the control ring 35 comprises a driving disk 38 which is mounted about an axis 37 carried in the shutter housing, the disk 38 being biased in a counterclockwise direction by a driving spring 39. Affixed to the driving disk 38 is a gear 40, which meshes with a pinion 42 turnable about an axis 41, and having attached to it a gear 43 which, in turn, meshes with gear teeth 35b provided on the control ring 35 (FIG. 3). Accordingly, turning of the driving disk 38 in a counterclockwise direction will effect a similar or counterclockwise turning movement of the control ring 35, and such movement will be accompanied by a similar movement of the setting ring 34 under the action of the biasing spring 33. In addition, the gear 40 meshes with a gear 44 which is connected to the driving disk 4 of the shutter for the purpose of cocking the said disk. The connection is established by means of a pin 45 which is affixed to the gear 34, and in whose path of movement there is an arm 46 attached to the axis 3 of the cocking and driving disk 4. Thus, a separable driving connection is established by the pin 45 and arm 46. The driving disk 38 is cocked in a well-known manner not illustrated for reasons of clarity and brevity, by means of the film transport device of the camera. During this operation of cocking the driving disk 38, the driving disk 40 for the shutter and also the exposure setting member 34 are simultaneously cocked by means of the above mentioned uni-laterally acting driving devices 45, 46 and 35a, 36.

A lever 47 serves to retain the driving disk 38 in its cocked position. The said lever is pivotally movable (FIG. 1) about an axis 48 carried by the shutter base plate 2, and is biased in a counterclockwise direction by a spring 49. One arm 47a of the lever 47 carries a bent lug 47b which, for the cocked position of the driving disk 38, engages under the action of the spring 49 a projection 38a on the disk 38. The other arm 47c of the lever 47, on the other hand, is disposed in the path of travel of a pin 50 which is affixed to the shutter release lever 51. The shutter release 51 is pivotally movable about an axis 52 carried by the shutter base plate 2, and is biased in a clockwise direction by a spring 53. The lever 51 is coupled with the camera release member (not shown) by means of an arm 51a which passes through the rear wall of the shutter housing 1.

Upon actuation of the release lever 51, the pin 50 carried thereby engages the arm 47c of the detent lever 47, pivoting the same clockwise so as to effect release of the cocked driving disk 38. Such release occurs upon movement of the lever 47 to an extent sufficient to disengage the lug 47b thereof from the projection 38a of the driving disk 38. If the delayed action device is in its uncocked state during this operation, the released driving disk 38 and the control ring 35 connected with it move jointly into an end position under the action of the driving spring 39. The exposure setting ring 34 follows partly this motion of the control ring 35 under the action of its spring 33, until such setting ring is stopped by means of the automatic exposure setting device, in an adjusted position which is representative of the prevailing light conditions in conjunction with any setting for additional exposure factors.

But if the delayed action device is in its cocked state, the members 34, 35 and 38 which are released for running down movement are stopped after having traveled a short initial path, during which the locking device 31a, 32 which retains the delayed action device in its cocked position, is released. Such release is effected by the control ring 35 and more particularly by the arm 35a thereof, which engages the arm 31b of the detent lever 31. The halting of the driving disk 38 and rings 34 and 35 is effected by a second locking device (described below) which is placed in operative position in response to placing the delayed action device in its cocked state and which second locking device is releasable by and in response to completion of the running down movement of the delayed action device, thereby to finally effect a relase of the members 34, 35 and 38.

In the illustrated embodiment of the invention shown in FIGS. 1 and 3 the said second locking device comprises a lever 54 which is positioned coaxially with the detent lever 31 of the delayed action device. The lever 54 has a pin-and-slot connection 54a, 55 with the toothed segment 51 of the delayed action device, and has an arm 54b which, in the cocked state of the delayed action device, is disposed in the path of movement of a lug 35c projecting laterally from the arm 35a of the control ring 35. In addition, if the delayed action device is in its cocked state, an arm 31b of the detent lever 31 of the delayed action device is disposed in the path of movement of the lug 35c. The arrangement of the two arms 31b and 54b with respect to the lug 35c is such that the said lug, upon the control ring 35 running down, first strikes the arm 31b of the detent lever 31 so as to pivot the latter counter-clockwise, thereby to release the delayed action device against the action of a spring 56. Such counterclockwise pivotal movement of the detent lever 31 will disengage the nose 31a thereof from the three cornered pin 54, thus to release the delayed action device. The lug 35b next engages and strikes the arm 54b of the arresting lever 54 and is halted thereby, thus preventing further running down movement of the members 34, 35 and 38.

While the delayed action device is running down, the arresting lever 54 is pivoting in a counterclockwise direction by virtue of the driving connection 54a, 55. This causes the arm 54b of the lever to shortly disengage the arm 35c of the control ring 35 after the termination of running down movement of the delayed action device, so that now the control ring 35 is freed, together with the driving disk 38 which is connected thereto. Therefore, the ring 35 and disk 38 jointly move into an end position under the action of the spring 39.

The arresting lug 47b of the detent lever 47 associated with the driving disk 38 engages, during the running down movement of the disk 38, the outer circumference 38x of such disk which is constructed as a cam. By means of such cam 38x the lever 47 is pivoted still further in a clockwise direction, so that a pin 57 of the lever finally engages the arresting lever 12 which is retaining the cocked driving disk 4 in its cocked position. Such engagement effects a pivotal movement of the arresting lever 12 in a clockwise direction, thereby to effect release of the driving disk 4.

In order to make sure that the automatic setting of the exposure setting member 34 has been completed prior to opening of the shutter, the invention provides an additional delayed action device (which is not shown for the sake of brevity) of a well-known kind, which is releasable in response to the release of the camera or of the shutter, and which delays the start of the opening of the shutter by a specific period of time, with respect to the actuation of the camera release member. This period of time is so selected that the exposure setting ring 34 can travel its maximum path of movement within such time, and that shocks or percussions of the camera or of the shutter which may be possibly caused by or during running down of the ring 34, have died out.

Also associated with initial movement of the control ring 35 (until the lug 35c thereof strikes the arresting lug 54b) is a preliminary movement of the exposure setting ring 34, within which no control functions associated with the working range of the shutter are yet carried out, and within which the exposure setting ring 34 is not yet halted by the light intensity measuring device.

While the member which cooperates with the arresting lever 54 comprises, in the above described embodiments of FIGS. 1 and 3, the control ring 35, a retention of the release members 34, 35 and 38 where delayed action photographs are to be had, is effected in the embodiment of the invention shown in FIG. 2 by means of a second locking device which acts on the driving disk 38 itself.

This second locking device as illustrated in FIG. 2 comprises a two-armed lever 58 which is movable about an axis 59 carried on the shutter base plate 2 and is biased in a counter-clockwise direction by a spring 60. One arm 58a of the detent lever 58 has a bent lug 58b which cooperates, when the delayed action device is in its cocked state, with the projection 38a of the driving disk 38 in such a manner that the lever 58 halts the released disk 38 after the latter has had a slight initial movement, within which movement the delayed action device is released by the bent lug 35c of the control ring 35.

In order to connect the arresting lever 58 to the delayed action device, an additional two-armed lever 61 is provided, which is positioned coaxially with respect to the arresting lever 31 of the delayed action device. The one arm 61a of the lever 61 has a pin-and-slot connection 61b, 62 with the toothed segment 21 of the delayed action device. The other arm 61c of the lever 61 is engageable, in a manner described below, with the pin 63 which is fixed on and carried by the arm 58c of the arresting lever 58.

The mode of operation of the above described devices is as follows:

When the delayed action device is not placed in its cocked state, the toothed segment 21 is in the position shown in FIG. 1. Associated with this position, referring to FIG. 1, is a particular position of the arresting lever 54 wherein its arm 54b is disposed outside of the path of movement of the bent lug 35c of the control ring 35.

Upon depressing the release lever 51 against the action of the spring 53, the pin 50 thereof engages the arresting lever 47 and shifts the latter clockwise to such an extent that the lug 47b thereof is disengaged from the shoulder 38a of the cocked driving disk 38. This releases the driving disk 38, and as the latter starts to run down, the lug 47b of the arresting lever 47 (now functioning as a cam follower) engages the cam 38x of the disk, causing the lever to still pivot further in a clockwise direction. During such movement the pin 57 of the lever 47 comes into engagement with the arresting lever 12 which is retaining the cocked driving disk 4 of the shutter in its cocked position. The arresting lever 12 is pivoted in a clockwise direction, thereby releasing the driving disk 4.

Considering the operation when the delayed action device is placed in its cocked state by manual actuation of the toothed segment 21 it will be seen that the arresting lever 54 will occupy a shifted position which is indicated by the broken outline in FIG. 1. In such position the arresting arm 54b of the lever 54 is located in the path of movement of the lug 35c of the control ring 35. If the cocked driving disk 38 is now released for running down movement in response to actuation of the release lever 51, the bent lug 35c of the control ring 35 first comes into engagement with the arresting lever 31 of the delayed action device, pivoting the said lever counter-clockwise against the action of its spring 56, thereby to release the cocked delayed action device. After the delayed action device has thus been released, the locking device 35c, 54a becomes operative in the previously described manner, and prevents the members 34, 35 and 38 from running down further.

During the running down of the delayed action device, the arresting lever 54 is pivoted in a counter-clockwise direction, whereby at the end of the running down movement of the delayed action device the arm 54b thereof disengages the bent lug 35c of the control ring 35. This effects a release of the ring 35 and the coupled driving disk 38 connected to it, whereby these now both jointly move into an end position under the action of the driving spring 39. As already described, the exposure setting ring 34 follows this movement of the ring 35 under the action of its spring 33 until such setting ring is halted in an adjusted position by means of the automatic setting device, such halted position being representative of the prevailing light conditions taken in conjunction with the setting of additional exposure factors.

Considering the operation of the embodiment illustrated in FIG. 2, it will be noted that when the delayed action device is not placed in its cocked state, the arresting lever 58 is maintained, by means of the members 21 and 61 in a position in which the arresting lug 58b thereof is not engageable with the projection 38a of the driving disk 38 when the latter is running down. Accordingly, the running down movement of the driving disk 38 and control ring 35, and the following adjustment of the setting ring 34 is not interfered with and is similar to that described above in connection with FIG. 1.

Considering the situation in FIG. 2 where the delayed action device is placed in its cocked position as shown in this figure, this has the result of pivoting the connecting lever 61 in a clockwise direction and releasing the arresting lever 58 which was heretofore retained in its inoperative position. The arresting lever 58 is now able to move under the action of its spring 60 into the arresting position shown in FIG. 2. If the cocked driving disk 38 is now released for running down movement in response to actuation of the release lever 51, the lug 35c of the control ring 35 initially engages the arresting lever 31 of the delayed action device, pivoting the latter against its spring 56 and releasing the delayed action device. After such release, the locking device 38a, 58b of FIG. 2 becomes operative in the previously described manner and prevents the members 34, 35 and 38 from running down further. During the running down of the delayed action device, the arresting lever 58 is pivoted in a clockwise direction whereby at the end of the running down of the delayed action device the arresting lug 58b of the lever 58 is disengaged from the projection 38a of the driving disk 38. The released driving disk 38 and the control ring 35 connected with it now move jointly into an end position under the action of the driving spring 39. The exposure setting ring 34 partially follows the movement of the ring 35, to a point where it is halted under the action of the automatic setting device, the halted position being representative of the prevailing light conditions taken in conjunction with additional exposure factors.

In accordance with the foregoing it may now be understood that the invention has provided a photographic camera with automatic exposure setting means which has the very important advantage that the automatic exposure setting operation occurs only immediately prior to release of the camera shutter, both for exposures with and without the use of the delayed action device. This insures a maximum of accuracy in the exposure setting, for each of the above mentioned types of photographs.

In obtaining this advantage, moreover, a camera as constructed in accordance with the invention does not require any complicated, costly devices which might limit the flexibility of the camera structure. This is due to the fact that exposures both with and without the delayed action device differ as to the mode of operation of the camera (as provided by the invention) only in that, for the case where the delayed action device is used a functional running down which takes place without interruption when not using the delayed action device, is temporarily interrupted and thereafter released (in response to the operation of the delayed action device) for continuation and completion.

This operation is effected by the provision of a single locking device which is placed in its operative position in response to placing the delayed action device in its cocked state, and which halts the released control member after a short initial movement of the latter, which movement serves to release the delayed action device, the said locking device in turn being released in response to running down movement of the delayed action device, thereby to again release the control member.

I claim:

In a photographic camera, in combination, an adjustable exposure setting member adapted to have its adjusted position determined by a light intensity measuring device; a movable control member and transmission means between said members, providing a control over movement of the setting member by the control member; a powered driving device for moving said control member; a releasable locking device adapted to be released by the camera release, for retaining in cocked position the control member; a powered shutter drive device and means for releasing the same at the end of the running-down movement of the control member; a mechanical delayed action device having cocked and run-down states; a second releasable locking device for halting the control member after its release and an initial movement through part of its path of travel; means rendering the second locking device operative when the delayed action device is in the operative state; means responsive to said initial movement of the control member, for releasing the delayed action device from the cocked state, said setting member having concurrent initial movement with the initial movement of the control member, said second locking device being rendered inoperative in response to running down of the delayed action device, thereby to release the control member for completion of movement of the latter.

References Cited in the file of this patent

UNITED STATES PATENTS

| | | |
|---|---|---|
| 2,887,025 | Rentschler | May 19, 1959 |
| 2,943,545 | Fahlenberg | July 5, 1960 |
| 2,978,970 | Fahlenberg | Apr. 11, 1961 |